July 31, 1928.
J. G. BLUNT
1,679,151
TRUCK FOR RAILROAD VEHICLES
Filed Feb. 15, 1927　　3 Sheets-Sheet 2
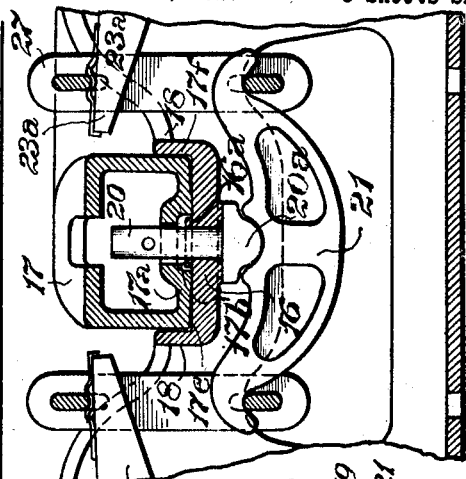
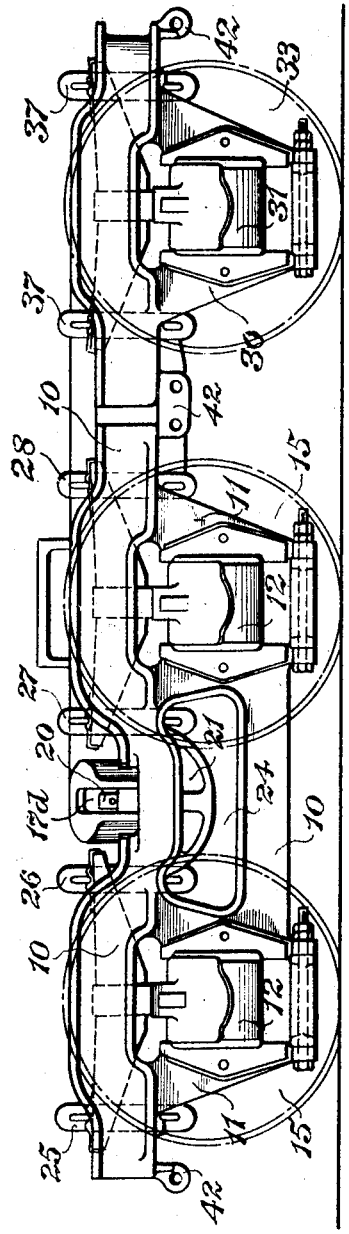
WITNESSES
INVENTOR July 31, 1928.
J. G. BLUNT
1,679,151
TRUCK FOR RAILROAD VEHICLES
Filed Feb. 15, 1927
3 Sheets-Sheet 3
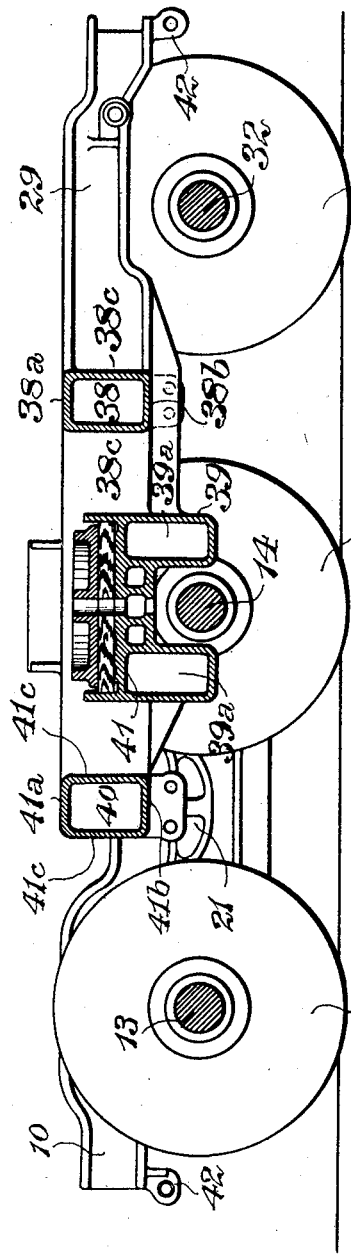
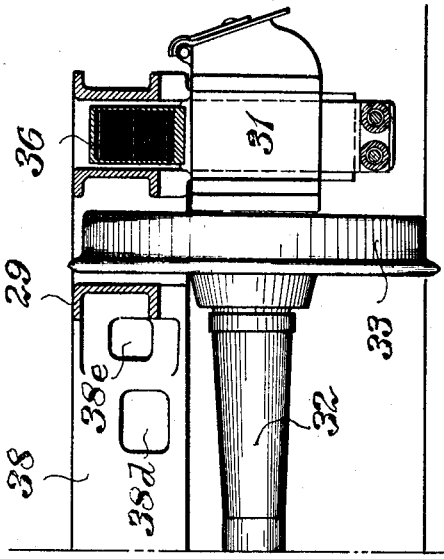
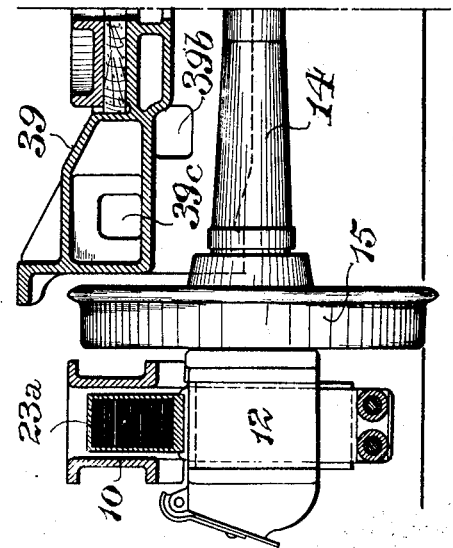

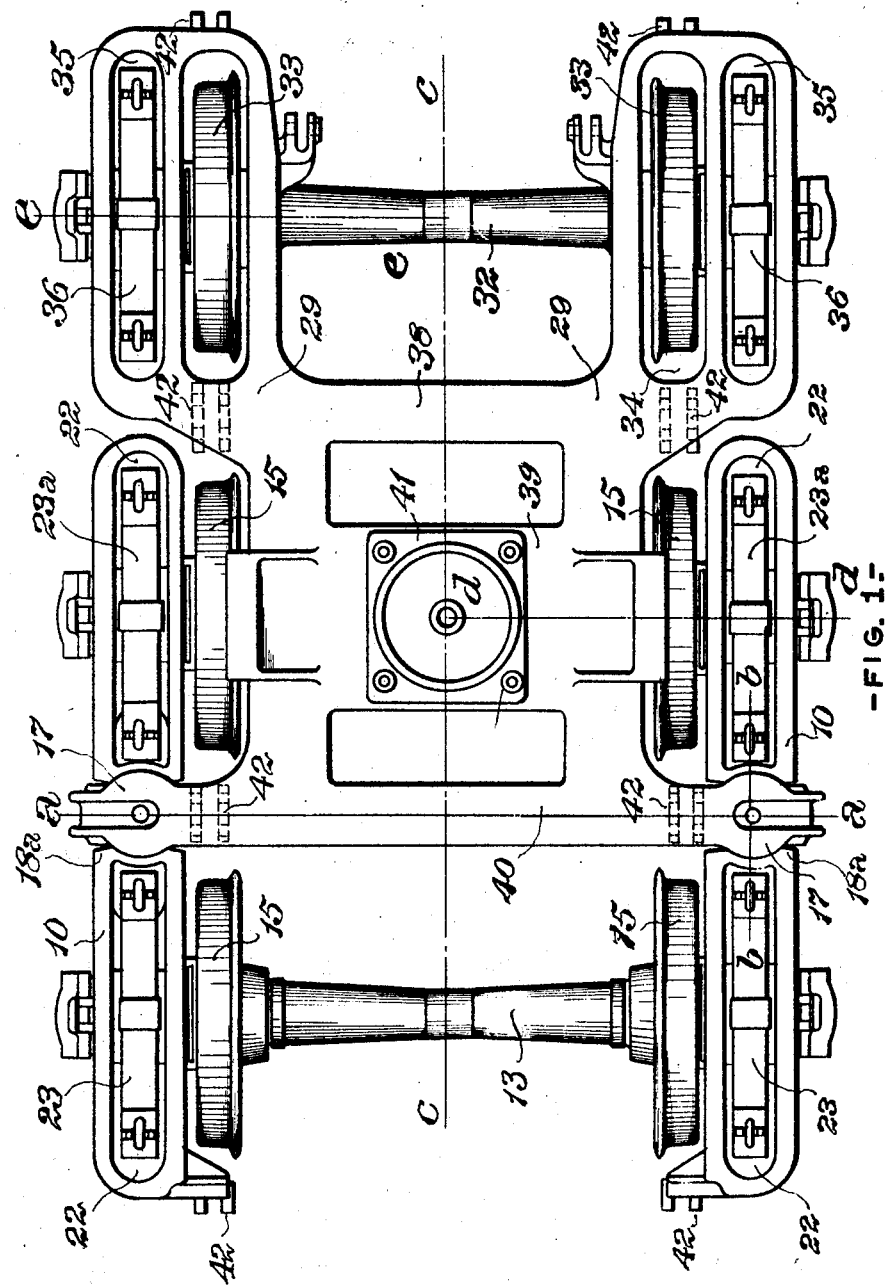

Patented July 31, 1928.

1,679,151

UNITED STATES PATENT OFFICE.

JAMES G. BLUNT, OF SCHENECTADY, NEW YORK.

TRUCK FOR RAILROAD VEHICLES.

Application filed February 15, 1927. Serial No. 168,286.

My invention more particularly relates to six wheel trucks, and has for its object to provide a truck of such type, which will be of strong and durable construction; which can be fabricated of a minimum number of parts; which can be economically manufactured; which will have the requisite flexibility to efficiently accommodate itself to curved track; and in which the associated parts are arranged to distribute the load imposed on the truck equally among the three axles thereof.

The improvement claimed is hereinafter fully set forth.

In the accompanying drawings: Figure 1, is a plan or top view of a truck embodying my invention; Fig. 2, a side view, in elevation, of the same; Fig. 3, a vertical transverse section on the line, $a\ a$, of Fig. 1; Fig. 4, a vertical longitudinal section on the line, $b\ b$, of Fig. 1; Fig. 5, a vertical longitudinal section on the line, $c\ c$, of Fig. 1; Fig. 6, a vertical transverse section on the line, $d\ d$, of Fig. 1; and Fig. 7, a vertical transverse section on the line, $e\ e$, Fig. 1.

In the practice of my invention, referring descriptively to the specific embodiment thereof which is herein exemplified, the truck comprises a two axle section, and a one axle section, articulated thereto. The two axle section, comprises two independent side frames, 10, each having two pairs of pedestals, 11, which receive journal boxes, 12, which are mounted on the axles, 13, and 14, of the wheels 15.

In order to provide for articulating the one axle section to the two axle section so that the requisite pivotal movement may occur between the two sections on curved track, each side frame member, 10, of the two axle section, is formed at its top, intermediate the two pairs of pedestals, with a depressed portion, providing a circular bearing or seat, 16, which supports one of the load transmitting arms, 17, of the frame of the one axle section of the truck. Two semi-cylindrical vertical upstanding flanges, 18, are provided for each bearing seat, 16, one being disposed diametrically opposite the other, and on a line extending longitudinally of the side frame. These flanges serve to transmit the longitudinal thrusts from the center plate to the side frames. Each of the load transmitting arms, 17, of the one axle section of the truck, which bear on the seats, 16, is formed with two depending semi-cylindrical vertical flanges, 19, which fit between the upstanding flanges, 18, on the side frames, and extend below the bearing seats, 16. These flanges serve to absorb the lateral thrusts. The inner and outer vertical edges, 18$^a$, of the flanges, 18, are beveled to permit the vertical flanges, 19, of the arms, 17, to swivel about the seats, 16.

A further swivel connection is provided between each bearing seat, 16, and each load transmitting arm, 17, by a pin, 20, which projects through a central opening in the seat, 16, and an opening in the bearing portion, 17$^a$, of the arm. The pin, 20, is provided with a rounded head 20$^a$, which serves as a fulcrum for the equalizing lever, 21.

By forming the bearing seat, 16, in a depression in the side frames, the plane of lateral thrust is lowered nearly to the horizontal plane of the axles and thus the tendency of the frames to tilt sideways on curves is minimized.

To provide for properly lubricating the bearing seat, 16, the bearing portion, 17$^a$, of the load transmitting arm, is formed with a circular recess, 17$^b$, into which projects a circular boss, 16$^a$, formed on the seat, 16. The space between the bottom of the recess, and the top of the boss, forms a chamber for the storage of lubricant. To enable the chamber to be easily supplied with lubricant, the top wall of the arm, 17, is formed with an opening, 17$^d$, and a clearance, 17$^e$, is provided between the pin, 20, and the opening in the bearing portion, 17$^a$, of the arm.

In order to provide for a slight longitudinal tilting action between the side frames of the two axle section of the truck and the frame of the one axle section, the bearing faces, 17$^f$, of the portions, 17$^a$, are oppositely beveled, as indicated in Fig. 4.

Each side frame member, 10, of the two axle section of the truck is formed hollow, to provide two longitudinally extending pockets, 22, for the semielliptic springs, 23, and 23$^a$, which bear on the journal boxes, 12. A suitable opening, 24, is provided in each side frame, through which the equalizing lever, 21, may be installed.

In order to provide for distributing the weight imposed on the two axle section of the truck equally between the two axles thereof, one end of the spring, 23, is connected by a link, 25, to the side frame; the other end of the spring, 23, is connected by a link, 26, to one end of the lever, 21; the other end of the lever, 21, is connected by a link, 27, to one end of the spring 23ª, and the other end of the spring 23ª is connected by a link, 28, to the side frame.

The one axle section of the truck comprises a frame preferably formed as a one piece casting, and embodying two side sills, 29, each formed with a pair of pedestals, 30, which straddle the journal boxes, 31, mounted on the axle, 32, of the wheels, 33. Each side sill is formed at one end with a pocket, 34, which receives the upper portion of the wheel, 33, and a pocket, 35, which houses the semi-elliptic spring, 36, which is connected to the frame by links, 37. The side sills of the frame are joined together by three hollow transoms, 38, 39 and 40. The transom, 38, is disposed between the axle of the two wheel section of the truck and the middle axle of the truck; and is substantially rectangular in cross section, having a top wall, 38ª, a bottom wall, 38ᵇ, and two side walls, 38ᶜ. Two openings, 38ᵈ, and 38ᵉ, are provided near each end of each of the side walls, 38ᶜ, for the passage of brake rods.

The transom, 39, supports the center plate, 41, and comprises two transversely extending spaced hollow portions, 39ª, rectangular in cross section, which straddle the axle, thus providing a construction which while possessing great strength and rigidity, enables the center plate to be set low on the truck. Two openings, 39ᵇ, and 39ᶜ, are provided near each end of each of the rectangular portions, 39ª, for the passage of brake rods.

The transom, 40, is substantially rectangular in cross section, having a top wall, 41ª, a bottom wall, 41ᵇ, and two side walls, 41ᶜ. Two openings, 41ᵈ, and 41ᵉ, are formed near each end of each of the side walls, 41ᶜ, for the passage of brake rods. The transom, 40, is extended at each end to provide the arms, 17, by which a portion of the weight imposed on the centre plate will be transmitted to the side frames of the two axle section of the truck. It is to be noted that as the distance between the centre of the centre plate, and the axis of the axle of the one axle section of the truck is twice as great as the distance between said centre and the point of bearing on the side frames of the two axle section of the truck; twice as much weight will be imposed on the two axle section of the truck as is imposed on the one axle section, and as the weight imposed on the two axle section is equalized between the two axles thereof, each of the three axles of the truck will carry the same load.

It is further to be noted that the omission of end transoms or crossties in my improved construction, provides ample space for the accommodation of draw gear.

Another important feature of my invention is the novel disposition of the brake shoe hanger lugs, 42. Ten pairs of these lugs are integrally cast on the frame of the one axle section of the truck and one pair on each of the side frames of the two axle section. This disposition of the lugs prevents injurious cramping between the two sections of the truck when the brakes are applied. Where brake shoes are applied on one side of the wheels only, all of the hanger lugs may be integrally cast on the frame of the one axle section.

I claim as my invention and desire to secure by Letters Patent:

1. In a six wheel truck for railroad vehicles, the combination of a two axle section; and a one axle section, articulated thereto, the two axle section having independent side frames, each formed with pedestals and pockets for housing spring equalizing mechanism.

2. In a six wheel truck for railroad vehicles, the combination of a two axle section; and a one axle section, the two axle section having independent side frames, the one axle section having an integral cast metal frame, adapted to support the load imposed on the truck, and formed with portions overlying and pivotally connected to the side frames, and adapted to transmit a portion of the load thereto.

3. In a six wheel truck for railroad vehicles, the combination of a two axle section, having independent side frames; and a one axle section having an integral frame comprising a centre plate for supporting the imposed load, pedestals, transoms, and portions overlying and pivotally connected to the side frames, and adapted to transmit a portion of the load thereto.

4. In a six wheel truck for railroad vehicles, the combination of a two axle section, having independent side frames; and a one axle section, having an integral frame, comprising a center plate for supporting the imposed load, pedestals, spring pockets, transoms, and portions overlying and pivotally connected to the side frames for transmitting a portion of the load thereto.

5. In a six wheel truck for railroad vehicles, the combination of a two axle section, having independent side frames; and a one axle section, having an integral frame, comprising a centre plate for supporting the imposed load, pedestals, spring pockets, wheel pockets, transoms, and portions overlying and pivotally connected to the side frames, for transmitting a portion of the load thereto.

6. In a six wheel truck for railroad vehicles, the combination of a two axle section, having independent side frames; and a one axle section, having an integral frame, comprising a centre plate for supporting the imposed load, pedestals, side bearings, spring pockets, wheel pockets, transoms, and portions overlying and pivotally connected to the side frames, for transmitting a portion of the load thereto.

7. In a six wheel truck for railroad vehicles, the combination of a two axle section, having independent side frames; and a one axle section, having an integral frame, comprising a centre bearing for supporting the imposed load, pedestals, side bearings, a plurality of brake shoe hanger lugs, spring pockets, wheel pockets, transoms, and portions overlying and pivotally connected to the side frames for transmitting a portion of the load thereto.

8. In a six wheel truck for railroad vehicles, the combination of a two axle section, having independent side frames; and a one axle section, having an integral frame, comprising a centre bearing for the imposed load, pedestals, side bearings, a plurality of brake shoe hanger lugs, spring pockets, wheel pockets, transoms formed with openings for the passage of brake rods, and portions overlying and pivotally connected to the side frames for transmitting a portion of the load thereto.

9. In a six wheel truck for railroad vehicles, the combination of a two axle section, having side frames, each embodying a pair of brake shoe hanger lugs; and a one axle section, having a frame articulated directly to each of the side frames, and embodying brake shoe hanger lugs for ten brake shoes.

10. In a six wheel truck for railroad vehicles, the combination of a two axle section, comprising two side frames, each having a bearing seat disposed intermediate the two axles, spring pockets and equalizer lever pockets, a spring in each of the spring pockets, and an equalizing lever in each of the lever pockets; and a one axle section having a frame extending over the two axle section, and embodying bearings pivotally engaging the seats of the two axle section, and a centre plate disposed over one of the axles of the two axle section.

11. In a six wheel truck for railroad vehicles, the combination of a two axle section, comprising two side frames, each having a bearing seat, comprising two curved upstanding flanges; and a one axle section, having a frame comprising two bearing seats pivotally engaging the bearing seats of the side frames, each comprising two curved depending flanges adapted to fit between the flanges of bearing seats of the side frames.

12. In a six wheel truck for railroad vehicles, the combination of a section having two axles; journal boxes, mounted on the axles, springs supported on the journal boxes; and independent side frames supported by the springs; and a section, having one axle, journal boxes mounted thereon, springs supported on the journal boxes, a frame supported on the springs, and having portions pivotally bearing on the side frames.

JAMES G. BLUNT.